UNITED STATES PATENT OFFICE.

FRANCIS BAKER, OF BOSTON, MASSACHUSETTS.

IMPROVEMENT IN PREPARING SALT.

Specification forming part of Letters Patent No. 122,100, dated December 26, 1871.

*To all whom it may concern:*

I, FRANCIS BAKER, of Boston, county of Suffolk and State of Massachusetts, have invented a certain Improved Process of Preparing Sea Salt for Table Use, of which the following is a specification:

The nature of my invention consists in subjecting ground salt to a treatment by which it is thoroughly dried and separated into granulated salt and flour of salt; the object being to produce a salt that will not be liable to cake, the principle involved being that salt in a state of fine granulation, if free from the flour of salt or the impalpable powder, will not cement together, as the contact of the angular particle is not sufficiently intimate. This principle is illustrated by the fact that coarse salt in bulk may be shipped any distance or stored for any length of time without becoming caked. It is not essential that all of the flour of salt be removed, as a removal of a part, together with the hot-air-drying process, is sufficient to prevent the caking of the salt, except under peculiar circumstances.

It is well known to chemists that the ordinary coarse salt of commerce has within it small cavities filled with water holding impurities in solution. The process of drying salt before it is ground does not free the salt from the water intermingled within the lamina of the crystals. Salt, however well dried before being ground, still contains a great deal of water, which is set free by grinding. This moisture has usually been driven out by the roasting process. This process, though to some extent effectual, leaves the salt in a condition to readily become caked or hard from two reasons: first, the salt is not thoroughly dried; and second, there is mixed with the grains of the salt an impalpable dust or flour which increases the hygroscopic quality of the mass and serves as a cement for uniting the grains. The cementing quality of this flour has heretofore escaped the attention of salt manufacturers, and they have confined their efforts to chemical processes for rendering salt non-cementable, the common method being to boil the salt in a saturated brine, thus allowing the chlorides of magnesium, lime, &c., to be taken up by the hot brine. The brine, being subsequently drawn off, carries with it the compounds of magnesium, lime, &c. This, though effectual, is expensive and but little resorted to.

I will now proceed to set forth my method of preparing salt.

The best quality of sea salt is carefully dried, freed from foreign substances, and ground in the usual manner, after which the ground salt is subjected to the following treatment: The salt is sifted or showered by any suitable mechanical appliances through a current of hot air, by which it is dried, and winnowed or separated into granulated salt and flour of salt. This separation is effected by attaching to the drying-chamber a second chamber, into which the hot air, after it has extracted the moisture and the flour of salt from the granulated salt, flows. In the second or depositing-chamber the hot air, loaded with the flour of salt, slowly circulates, and, after having deposited the flour of salt, passes out through a ventilating-duct.

By my process I obtain two grades of salt. The first granulated and freed from the dust or flour. This grade is not liable to cake, as the contact between the particles is not an intimate one, as above set forth. The second grade—that is, the flour of salt—is a new article of commerce, and is very useful for mixing with various culinary articles, and though it masses together by pressure it never becomes so hard as not to be readily reduced to powder by slight manipulation.

I claim as my invention—

The above-described process of preparing salt for table use, substantially as described, and for the purpose set forth.

FRANCIS BAKER.

Witnesses:
 FRANK G. PARKER,
 WILLIAM EDSON.

(129)